United States Patent

Kihara

[15] 3,678,215

[45] July 18, 1972

[54] COUNTER FOR A TAPE RECORDER/PLAYBACK MECHANISM

[72] Inventor: Nobutoshi Kihara, Toyko, Japan

[73] Assignee: Sony Corporation, Toyko, Japan

[22] Filed: Aug. 5, 1970

[21] Appl. No.: 61,221

[30] Foreign Application Priority Data

Oct. 25, 1969 Japan ............................44/101375

[52] U.S. Cl. .........................179/100.2 Z, 235/91 R, 274/4 F

[51] Int. Cl. ................G11b 23/04, G11b 27/20, G06m 1/08

[58] Field of Search ................179/100.2 Z; 235/91 G, 91 L, 235/91 M, 91 R; 274/4 B, 4 C, 4 E, 4 F

[56] References Cited

UNITED STATES PATENTS

| | | | |
|---|---|---|---|
| 2,477,146 | 7/1949 | Scherbatskoy | 179/100.2 Z |
| 2,661,156 | 12/1953 | Anderson | 235/91 R |
| 2,981,963 | 5/1961 | Peilet et al. | 235/91 R |

*Primary Examiner*—Bernard Konick
*Assistant Examiner*—Alfred H. Eddleman
*Attorney*—Lewis H. Eslinger, Alvin Sinderbrand and Curtis, Morris & Safford

[57] ABSTRACT

A tape cassette for use with a video tape recorder having a counter mounted in the cassette to indicate to the user, or other concerned parties, the amount of time the material which is recorded on the magnetic tape within the cassette has been used. The counter can only operate when it is properly mated with a member on the VTR chassis and a ratchet and pawl mechanism in which indicia is printed on the ratchet.

5 Claims, 4 Drawing Figures

NOBUTOSHI KIHARA

NOBUTOSHI KIHARA

COUNTER FOR A TAPE RECORDER/PLAYBACK MECHANISM

Tape cassettes are well known in the art and basically they include a housing having a tape on reels either in the same plane or in spaced apart planes. A signal is placed on the tape and a magnetic head scans the tape to reproduce the signal. These prior art cassettes are relatively inexpensive and are purchased from a store. Since the cassettes are so inexpensive, they are not sold on a rental basis.

With the arrival of the video tape records, (VTR) a cassette for holding the tape also became a desired means to handle the magnetic tape. The cassettes used with VTR's are not inexpensive, however, because the tape cost is high and the fees for programming video and audio material on a tape are high. In view of the high cost of these cassettes, it has been found to be economically feasible to rent the cassettes. The price to be paid as a rental fee depends upon the number of times the tape is actually used. Thus, a system had to be devised which would accurately reflect the actual number of times the tape was used.

This invention has solved the problem of keeping an accurate record of frequency of use by providing a counter which can be incorporated into a tape cassette.

The counter can not be inadvertently actuated or tampered with by unauthorized persons, because it is free to operate only when it is mounted on a VTR chassis. In one embodiment of the invention a longitudinal arm trips a lock lever when a cassette is placed on a VTR chassis. The counter is then free to operate. The movement of the first lever moves a second lever which rotates a ratchet wheel. Indicia appears on the face of the ratchet wheel which indicates hOw many times the cassette has been placed in the VTR chassis. Payment as a rental fee would be based, not on time, in this system, but would be based on the frequency of use.

It is a principal object of this invention to provide a counter to indicate the number of times a cassette is used.

It is another object of the invention to provide a counter in a tape record/playback mechanism which is operable when a cassette is placed on the mechanism.

It is yet another object of the invention to provide a counter for a tape record/playback mechanism which is simple to fabricate and inexpensive to manufacture.

It is another object of the invention to provide a counter for a video tape record/playback mechanism which indicates the number of times a cassette was placed on the mechanism to determine the charge for rental purposes.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which.

For the purpose of illustrating the present invention, a specific type of cassette for a video tape record/playback mechanism is shown. It should be understood, however, that the aspects of the present invention are applicable to the different types of cassettes well known to those skilled in the art, and it is not intended to limit the present invention to the specific type of cassette or tape record/playback mechanism illustrated.

Figure 1:
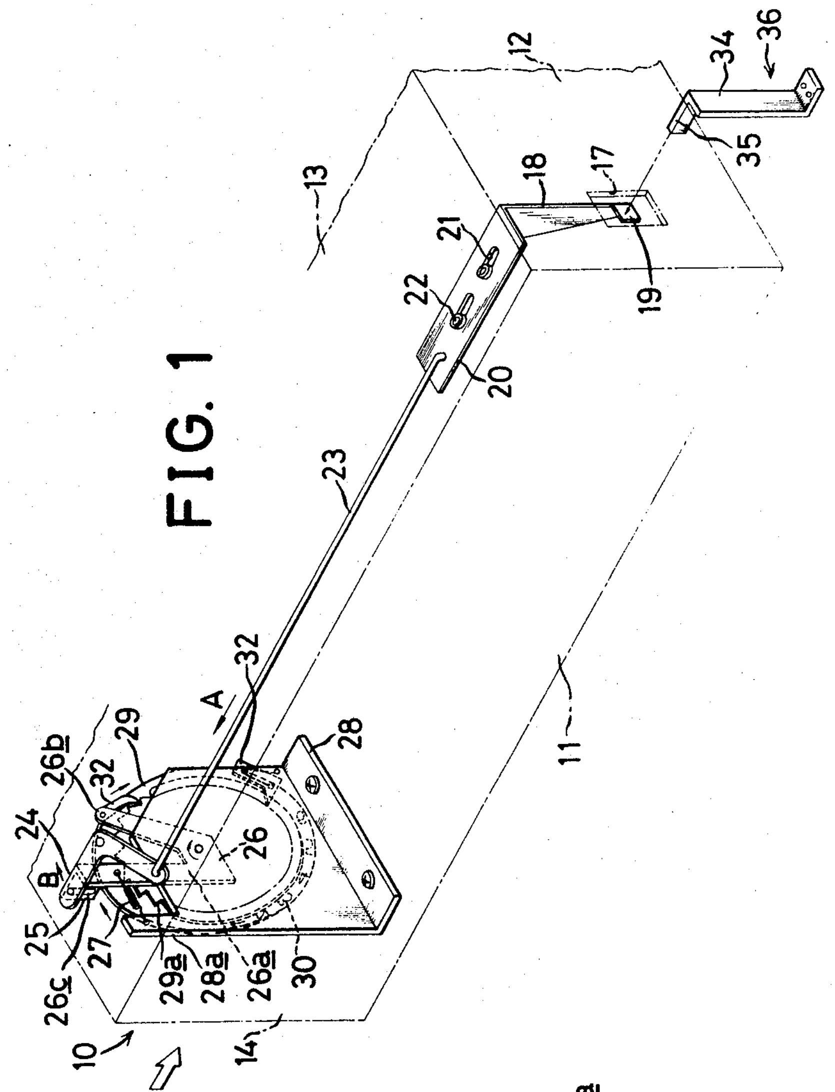
FIG. 1 is a perspective view showing part of a cassette having a counter therein.
Figure 2:
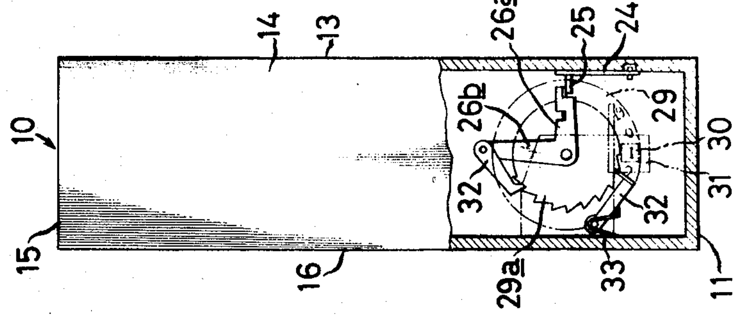
FIG. 2 is a side view of a cassette partly in section showing a counter therein.
Figure 4:
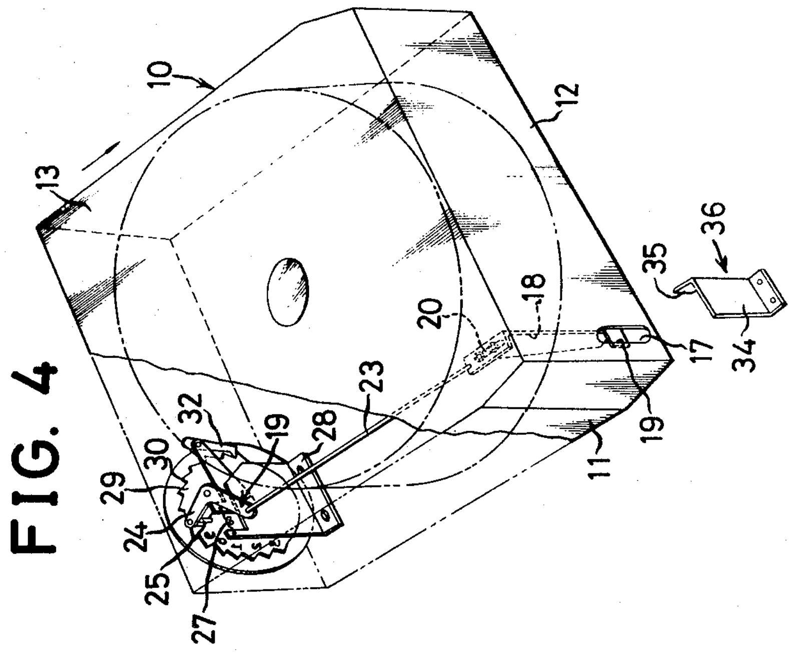
FIG. 4 is a perspective view partially cut open and showing parts in phantom lines.
Figure 3:
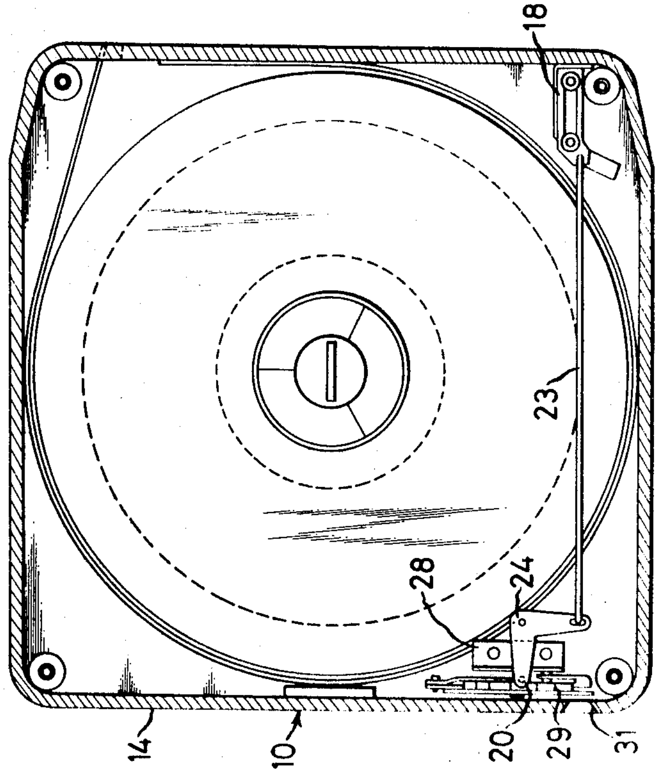
FIG. 3 is a top view of a cassette having a counter therein.

Referring now to the drawings, there is illustrated a tape cassette 10 formed by walls 11 – 16 which are preferably made of plastic, however, any desired material can be used. The end wall 12 has an opening 17 therein. A slidable link 18 having an abutment member 19 thereon is adjacent the opening 17. A plate 20 is fixed to the link 18 and has elongated slots therein. The link 18 is secured to the wall 13 of the cassette 10 by pins 22 having enlarged heads thereon which are wider than the width of the slots 21. The pins 22 maintain the link 18 in contact with the wall 13 so as to permit the plate 20 to slide on the cassette wall 13. An elongated rod 23 has one end secured to the plate and the other end loosely secured to a lever 24. The lever is pivotally mounted on the wall 13 of the cassette 10 so as to be mounted for rotation thereon. The lever 24 has a depending finger 25 attached to one end of one leg of the lever. It can thus be seen that movement of the link 18 to the left as viewed in FIG. 1 will cause the connecting rod 23 to move in the direction of the arrow A. Since the rod is rigid between the link 18 and the lever 24, the lever will be rotated in a clockwise direction as shown by the arrow B in FIG. 1. A second lever 26 is pivotally secured to an upright standard having a flanged base 28 which is secured to the bottom wall 16 of the cassette 10. The lever 26 has a vertical leg **26*a* and an angularly disposed leg 26*b*. An abutment 26*c* extends outwardly from the vertical leg 26*a* and is secured thereto, and extends into the path of movement of the depending finger 25. The lever 26 is biased in a counterclockwiSe direction by a coil spring 27 having one end fixed to an ear 28*a* on the standard 28 and having the other end secured to the vertical leg 26*a* of the lever 26. A ratchet wheel 29 having teeth 29*a* thereon is rotatably attached to the standard 28. Indicia 30, which can be in the form of numerals is applied to the outer surface of the ratchet wheel 29 whereby upon movement of the ratchet wheel, the indicia sequentially appears in a window 31 in the end wall 14 of the cassette 10. A pawl 32 is loosely pinned to the leg 26*b* of the lever 26 so as to lie in the same plane as the teeth 29*a* on the ratchet wheel 29**.

Thus, as the lever 24 is rotated clockwise, the finger 25 on the lever hits the abutment **26*c* thereby rotating the lever 26 in a clockwise direction. Since the pawl 32 is pinned to the lever 26 and has its nose portion located in one of the teeth on the ratchet wheel, the ratchet wheel is thereby rotated one notch and the succeeding number 30 imprinted on the ratchet wheel appears in the window 31. A locking pawl 32 is pivotally on the standard 28 and has a nose portion which contacts the teeth in the ratchet wheel. A spring 33 biases the pawl 32 into engagement with the teeth. The locking pawl prevents the wheel from being rotated in a counter-clockwise direction as viewed in FIG. 1 thereby eliminating the possibility of the unauthorized manipulation of the indicia 30**.

An upright engagement member 34 having an outwardly extending nose 35 engages and moves the abutment member 19 when the cassette 10 is placed on the chassis 36 of a tape record/playback mechanism. Movement of the cassette 10 to the right as viewed in FIG. 1 will force the link 18 to the left and cause a single movement of the wheel 29 whereby a succeeding number will appear in the window 31 showing how many times the cassette 10 was placed on the chassis of the tape record/playback mechanism. Thus, the user will be charged by the rental company for the number of times the cassette was placed on the chassis.

While there has been shown and described a particular embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the invention.

What is claimed is:

1. Apparatus for use with a tape record/playback mechanism comprising:

A. A cassette housing formed by walls comprising first and second end walls opposite each other;

B. Supporting means within said housing and attached to one of said walls;

C. A counter comprising an indicator member and a ratchet wheel attached thereto and rotatably mounted on said supporting means;

D. Actuating means slidably mounted in said housing, said housing having an opening adjacent said actuating means to allow interconnection between said actuating means and chassis-mounted means on a tape record/playback so that placing the cassette hOusing in operating position on the chassis causes said chassis-mounted means to move said actuating means;

E. A pawl to actuate said ratchet wheel;

F. A rigid link;

G. Means connecting one end of said link to said actuating means to be moved thereby; and H. Means connecting the other end of said link to said pawl to transmit actuating movements thereto to advance said ratchet wheel and said indicator member.

2. Apparatus as defined in claim 1 in which said supporting means comprises an upright standard affixed to one of said walls inside said housing.

3. Apparatus as defined in claim 1 in which said means connecting the other end of said link to said pawl comprises a first lever mounted within said housing and pivotally attached to one of said walls and connected to said pawl to actuate the same, said link being connected to one end of said lever.

4. Apparatus as defined in claim 3 further comprising:

A. A second lever pivotally mounted adjacent said first lever; and

B. A member on said first lever to abut against said second lever and cause said second lever to move, said second lever being connected to said pawl to move the same when said second lever is moved by said first lever.

5. Apparatus as defined in claim 4 further comprising means in said housing resiliently biasing said second lever toward said member on said first lever.

* * * * *